(12) United States Patent
Kiuchi

(10) Patent No.: US 8,582,977 B2
(45) Date of Patent: Nov. 12, 2013

(54) OPTICAL TRANSMISSION SYSTEM AND OPTICAL TRANSMISSION METHOD

(75) Inventor: Hitoshi Kiuchi, Tokyo (JP)

(73) Assignee: National Institutes of Natural Sciences, Tokyo (JP)

( * ) Notice: Subject to any disclaimer, the term of this patent is extended or adjusted under 35 U.S.C. 154(b) by 384 days.

(21) Appl. No.: 13/172,282

(22) Filed: Jun. 29, 2011

(65) Prior Publication Data

US 2012/0263465 A1 Oct. 18, 2012

(30) Foreign Application Priority Data

Apr. 18, 2011 (JP) .................................. 2011-091943

(51) Int. Cl.
*H04B 10/00* (2013.01)

(52) U.S. Cl.
USPC .......................................... 398/162; 398/158

(58) Field of Classification Search
USPC ................................................. 398/158, 162
See application file for complete search history.

(56) References Cited

U.S. PATENT DOCUMENTS

2009/0060524 A1\* 3/2009 Kiuchi ........................... 398/152
2011/0076027 A1 3/2011 Kiuchi

FOREIGN PATENT DOCUMENTS

JP 2009-60241 A 3/2009
JP 2011-71700 A 4/2011

\* cited by examiner

*Primary Examiner* — Shi K Li
(74) *Attorney, Agent, or Firm* — Birch, Stewart, Kolasch & Birch, LLP

(57) ABSTRACT

An optical transmission system includes: a two-lightwave generator for generating optical signals having wavelengths $\lambda 1$ and $\lambda 2$ from laser light; a photodetector for detecting a microwave signal M12 from two optical signals distributed by an optical coupler; an optical modulator for frequency-shifting the two optical signals; a Faraday reflector for reflecting the two optical signals; an optical coupler for mixing the two optical signals that have been reflected by the Faraday reflector, frequency-shifted again, transmitted by an optical fiber, and guided by a polarization beam splitter, with two optical signals distributed by an optical coupler; an optical demultiplexer for wavelength-dividing four mixed optical signals into optical signals having the wavelengths $\lambda 1$ and $\lambda 2$; photodetectors for detecting respective beat signals of the wavelength-divided optical signals having $\lambda 1$ and $\lambda 2$; and a phase difference detector for detecting a phase difference between the beat signals of the optical signals having $\lambda 1$ and $\lambda 2$.

6 Claims, 6 Drawing Sheets

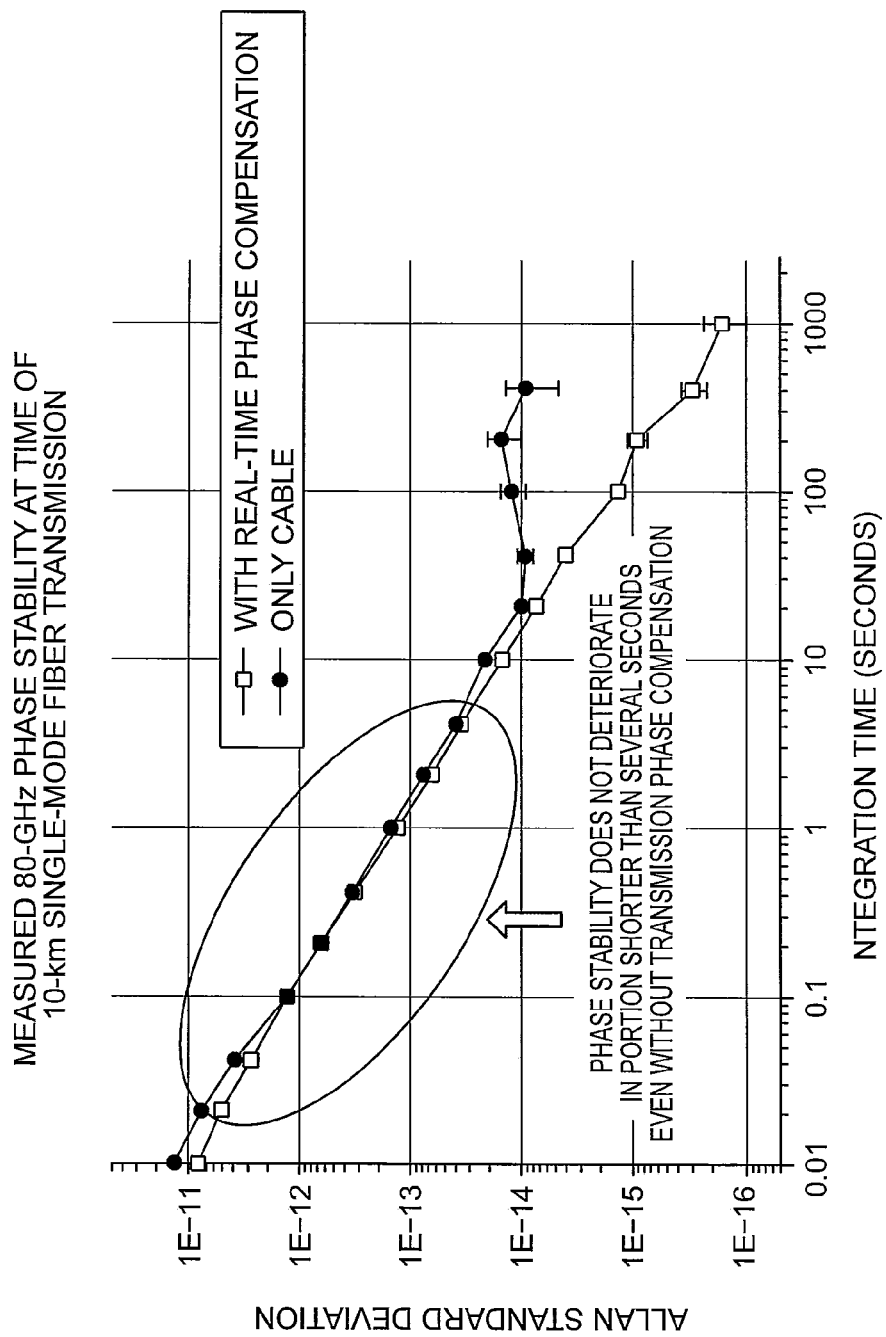

OPTICAL TRANSMISSION SYSTEM AND OPTICAL TRANSMISSION METHOD

BACKGROUND OF THE INVENTION

1. Field of the Invention

The present invention relates to an optical transmission system and an optical transmission method in which round-trip transmission phase compensation data is acquired at time intervals synchronized with integration timings at a signal transmission destination to perform transmission phase compensation in a postprocessing in a case where an integration processing is performed for a time shorter than several seconds at the signal transmission destination.

2. Description of the Related Art

FIG. 6 illustrates the effect of an improvement in a phase stability of a transmission signal using a transmission phase compensation device in the optical transmission systems disclosed in Japanese Patent Application Laid-open Nos. 2009-060241 and 2011-071700 in the form of a relationship between the measured phase stability and time (for example, 80 GHz and a transmission path length of 10 km).

FIG. 6 uses an internationally-used indicator called "Allan standard deviation" which indicates the phase stability of an atomic frequency standard or the like. In a case of only a fiber cable (black circle marks ●), a flicker frequency noise (the Allan standard deviation value is constant regardless of the lapse of time with a characteristic line being substantially horizontal) appears in 10 seconds or longer, and enters a state in which a phase is unstable. Meanwhile, in a case of using the inventions disclosed in Japanese Patent Application Laid-open Nos. 2009-060241 and 2011-071700 (white square marks □), it is clear that the signal transmission is performed over a long term while suppressing the flicker frequency noise and exhibiting a white phase noise with a stable phase (the Allan standard deviation value is in inverse proportion to time).

Occasions in which a high phase stability is demanded for a transmission signal are classified into a case (1) where real-timeness is required and a case (2) where real-timeness is not required. In general, the case (1) where the real-timeness is required is in great demand. Meanwhile, a signal processing performed by time integration at a signal transmission destination corresponds to the case (2) where the real-timeness is not required. For example, in astronomical observation, observed signals, which are extremely faint, are time-integrated and improved in signal-to-noise ratio, and then necessary data is acquired.

Referring to FIG. 6, it is clear that there is not much difference in the phase stability between use and non-use of a transmission phase compensation device in an integration time shorter than several seconds. In other words, optical fiber cable transmission does not have much influence on the short-term phase stability.

Therefore, in the case (2) where the real-timeness is not required, in particular, in a case where an integration processing is performed at the signal transmission destination for a time shorter than several seconds (approximately three seconds), there is no need to provide a phase-locked loop circuit for performing round-trip transmission phase compensation in real time, a microwave signal phase shifter, or the like of the optical transmission systems disclosed in Japanese Patent Application Laid-open Nos. 2009-060241 and 2011-071700. On the contrary, the phase-locked loop circuit, the microwave signal phase shifter, or the like complicates a system configuration, thereby increasing signal loss, which in turn inhibits the improvement in the phase stability of a transmitted signal. This further leads to a problem that digitization and larger packaging densities become hard to achieve and that a disadvantage is imposed on multipoint transmission compensation.

SUMMARY OF THE INVENTION

The present invention has been made in order to solve the above-mentioned problems, and an object thereof is to obtain an optical transmission system and an optical transmission method which are capable of simplifying a system configuration in a case where real-timeness is not required and therefore reducing signal loss and in turn improving a phase stability of the transmitted signal with the result that digitization and larger packaging densities become easy to achieve and that an advantage is given to multipoint transmission compensation.

According to the present invention, an optical transmission system for transmitting a high-frequency signal through an optical fiber over a long distance includes: a two-lightwave generator for generating, from laser light that has been input, an optical signal having a first wavelength and an optical signal having a second wavelength, which differ from each other by a frequency of a first microwave signal being the high-frequency signal, by using the first microwave signal; a first optical coupler for distributing two optical signals generated by the two-lightwave generator; a polarization beam splitter for guiding one pair of the two optical signals distributed by the first optical coupler to the optical fiber; a second optical coupler for distributing the two optical signals transmitted through the optical fiber; a first photodetector for detecting a second microwave signal from one pair of the two optical signals distributed by the second optical coupler; an optical modulator for frequency-shifting another pair of the two optical signals distributed by the second optical coupler by a frequency of a third microwave signal; a Faraday reflector for reflecting the two optical signals frequency-shifted by the optical modulator by applying Faraday rotation of 90 degrees thereto; a third optical coupler for mixing the two optical signals that have been reflected by the Faraday reflector, frequency-shifted again by the optical modulator, transmitted by the second optical coupler and the optical fiber, and guided by the polarization beam splitter, with another pair of the two optical signals distributed by the first optical coupler; an optical demultiplexer for wavelength-dividing four optical signals mixed by the third optical coupler into the optical signal having the first wavelength and the optical signal having the second wavelength; a second photodetector for detecting a beat signal of the optical signal having the first wavelength that has been wavelength-divided by the optical demultiplexer; a third photodetector for detecting a beat signal of the optical signal having the second wavelength that has been wavelength-divided by the optical demultiplexer; and a phase difference detector for detecting a phase difference between the beat signal of the optical signal having the first wavelength and the beat signal of the optical signal having the second wavelength, which are detected by the second photodetector and the third photodetector, respectively.

With the optical transmission system according to the present invention, it is possible to simplify a system configuration and therefore to reduce signal loss and in turn improve the phase stability of the transmitted signal with the result that digitization and larger packaging densities become easy to achieve and that an advantage is given to multipoint transmission compensation.

BRIEF DESCRIPTION OF THE DRAWINGS

In the accompanying drawings:

FIG. 6 is a graph illustrating characteristics of the Allan standard deviation with respect to the integration time in an optical transmission system with real-time phase compensation and an optical transmission system with no real-time phase compensation.

DETAILED DESCRIPTION OF THE PREFERRED EMBODIMENTS

In an optical transmission system according to the present invention, round-trip transmission phase compensation data is acquired at time intervals synchronized with integration timings at a signal transmission destination to perform transmission phase compensation in a postprocessing in a case (2) where real-timeness is not required, in particular, in a case where an integration processing is performed at the signal transmission destination for a time shorter than several seconds (approximately three seconds in experiments). At the signal transmission destination, time integration data acquired by a user, which differs according to the purpose of use, is subjected to transmission path phase compensation off-line by using the round-trip transmission phase compensation data acquired at a signal transmission source. It is natural that control or the like of a phase shifter or the like becomes unnecessary because phase swinging compensation is not performed within a time shorter than an integration time. In the experiments, the integration processing was performed for a time shorter than three seconds to confirm effectiveness thereof.

That is, the optical transmission system includes means for performing a round trip using return light that has been shifted in frequency in high stability optical signal transmission based on difference frequency between two light signals in a case where the integration processing is performed for a time shorter than several seconds (approximately three seconds) at the signal transmission destination, detecting the transmission light and round-trip return light by the principle of the Michelson interferometer, distinguishing round-trip transmission and reception light by setting a polarization state in which transmission light and reception light are made orthogonal to each other to thereby distinguish the transmission and reception signals of the round trip one from the other, and separating the transmission light and the return light one from the other by optical signals or microwave signals, and in the optical transmission system, the round-trip transmission phase compensation data is acquired at time intervals synchronized with signal integration timings at the signal transmission destination to perform the transmission phase compensation in the postprocessing. Hereinafter, optical transmission systems according to preferred embodiments of the present invention are described with reference to the accompanying drawings.

First Embodiment

Figure 1:
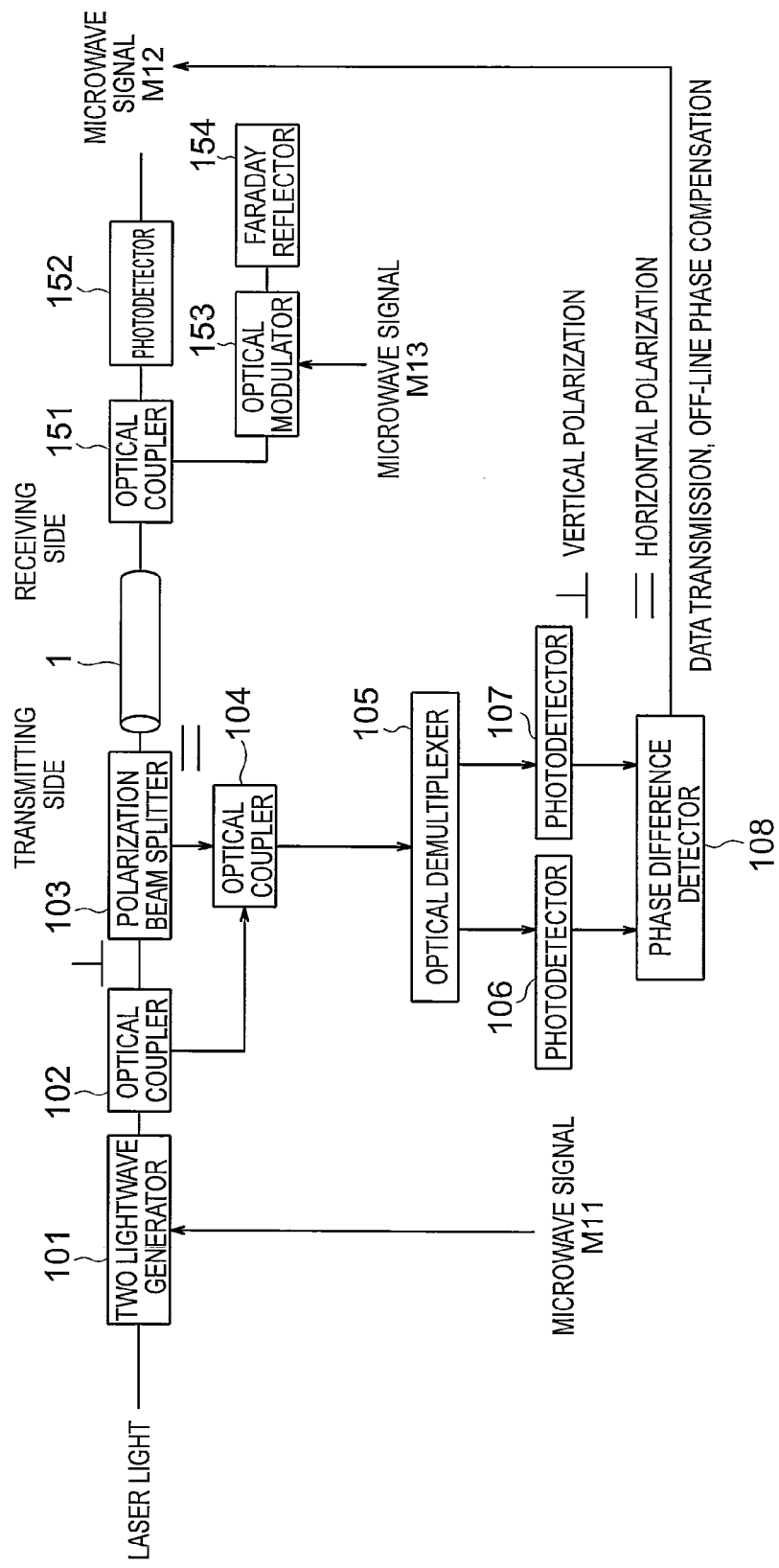
FIG. 1 is a diagram illustrating a configuration of an optical transmission system according to a first embodiment of the present invention.

FIG. 1 is referenced to describe an optical transmission system according to a first embodiment of the present invention. FIG. 1 is a diagram illustrating a configuration of the optical transmission system according to the first embodiment of the present invention. Note that, hereinafter, the same reference symbols within the respective drawings indicate the same or equivalent components.

In FIG. 1, the optical transmission system according to the first embodiment of the present invention is provided on a transmitting side with: a two-lightwave generator 101 for generating two coherent optical signals (having wavelengths $\lambda 1$ and $\lambda 2$) having different wavelengths from each other from laser light that has been input by using a microwave signal M11; an optical coupler 102 for distributing the two optical signals; a polarization beam splitter 103 for passing vertical polarization light between the optical coupler 102 and an optical fiber 1 and passing horizontal polarization light between the optical fiber 1 and an optical coupler 104; the optical coupler 104 for mixing the optical signals; an optical demultiplexer 105 for wavelength-dividing the two optical signals (having wavelengths $\lambda 1$ and $\lambda 2$); photodetectors 106 and 107 for detecting beat signals (having a frequency twice as high as a frequency of a microwave signal M13) of outward and return optical signals; and a phase difference detector 108 for detecting a phase difference between the beat signals output from the photodetectors 106 and 107, that is, a phase difference which occurs due to a round trip made through the optical fiber 1 and corresponds to an amount twice as large as a phase difference between the microwave signal M11 and a microwave signal M12.

Further, in FIG. 1, the optical transmission system according to the first embodiment of the present invention is provided on a receiving side with: an optical coupler 151 for distributing the optical signals; a photodetector (photomixer) 152 for detecting the microwave signal M12 from the two optical signals; an optical modulator 153 for frequency-shifting the two optical signals by using the microwave signal M13; and a Faraday reflector 154 for reflecting the two optical signals by rotating polarizations thereof by 90 degrees.

Note that, in FIG. 1, the optical fiber 1 is provided between the transmitting side and the receiving side. The optical fiber 1 is a general single-mode fiber for long-distance transmission, and an optical fiber that cannot retain the polarization can be used as the optical fiber 1.

Next, FIG. 1 is referenced to describe an operation of the optical transmission system according to the first embodiment.

The optical transmission system according to the first embodiment is configured to transmit a high-frequency signal having a frequency equal to or higher than 20 GHz by optical separation.

With regard to a transmission delay of the optical fiber 1, delays in the round trip made by the two optical signals are simultaneously measured for the two optical signals independently of each other, and a difference therebetween is measured as a transmission delay phase caused by the round trip of the transmission microwave signal.

On the transmitting side, two coherent optical signals having different wavelengths from each other is created from input laser light by the two-lightwave generator 101 by using the microwave signal M11. Thus created are the two optical signals (having wavelengths λ1 and λ2) that differ from each other by a frequency of the microwave signal M11. The microwave signal M11 is a high-frequency signal having a high stability to be transmitted. The two-lightwave generator 101 is configured to satisfy a condition that the two optical signals have their polarizations aligned, and may be a modulator such as an LN modulator or a system for creating two optical signals by using a sub-laser phase-locked with the laser light.

The two optical signals have a vertical polarization, and are guided to the optical coupler 102 and the polarization beam splitter 103. After passing through the optical fiber 1, the optical signals of the vertical polarization are distributed by the optical coupler 151 on the receiving side, and one pair of the two optical signals is guided to the photodetector 152 and output as the microwave signal M12. The user uses this signal (microwave signal M12) to perform a necessary signal processing including the integration processing. It is important that an integration processing time be three seconds or shorter.

The other pair of the two optical signals distributed by the optical coupler 151 is frequency-shifted by a frequency (shift frequency) of the microwave signal M13 as a round-trip signal by the optical modulator 153, and then reflected by the Faraday reflector 154. This Faraday reflector 154 applies Faraday rotation of 90 degrees to the optical signal, and hence the optical signal is reflected as an optical signal having a polarization that differs by 90 degrees. The reflected light is again frequency-shifted by the frequency of the microwave signal M13 by the optical modulator 153, then passes through the optical coupler 151 and the optical fiber 1, and is returned to the polarization beam splitter 103 on the transmitting side.

In consideration of reversibility of light, the returned optical signal becomes the optical signal having the polarization that differs by 90 degrees, therefore has a horizontal polarization, and is guided to the polarization beam splitter 103. The optical coupler 104 mixes the other pair of the two optical signals distributed by the optical coupler 102 with the two return optical signals from the polarization beam splitter 103. The optical signal from the polarization beam splitter 103 is different from the optical signal from the optical coupler 102 by a frequency twice as high as the frequency of the microwave signal M13.

The optical signals mixed by the optical coupler 104 are wavelength-divided (to have wavelengths λ1 and λ2) by the optical demultiplexer 105, and the beat signal of the optical signal having the wavelength λ1 and the beat signal of the optical signal having the wavelength λ2 are detected by the photodetector 106 and the photodetector 107, respectively. A frequency of the beat signal is a frequency twice as high as the frequency of the microwave signal M13. The phase difference between those beat signals is detected by the phase difference detector 108.

The phase needs to be measured in synchronization with a signal integration processing timing at a transmission destination (on the receiving side), but the synchronization within one integration time suffices. It is important that the integration processing time be three seconds or shorter, which does not disturb a short-term phase stability.

An amount of the phase difference corresponds to one round trip through the optical fiber 1. In other words, the obtained phase difference contains an influence corresponding to the round-trip of the delay caused by having passed through the optical fiber 1 and the like. Therefore, a half of the amount of the phase difference obtained by the phase difference detector 108 is obtained as an additional phase caused by the delay of the optical fiber 1 and the like. The measured amount of the phase difference, which is a transmission path phase correction amount, is transmitted to the transmission destination to perform correction off-line on the integrated signal processing data acquired by the user.

The frequency of the microwave signal M13 (shift frequency) is a low-frequency signal used for distinguishing the transmission optical signal from the return optical signal. The influence of the shift frequency and disturbance exerted during the transmission through the optical fiber 1, which enter the two optical signals in the same manner, can be handled as common-mode noise and disappear when the phase angle is calculated as a difference between the outputs from the photodetectors 106 and 107. In other words, there is no influence exerted on the amount of the phase difference obtained by the phase difference detector 108.

In the optical transmission system according to the first embodiment, the optical coupler 102, the polarization beam splitter 103, and the optical coupler 104 are structured by polarization retaining fibers. The polarization retaining fiber is much shorter than the optical fiber 1.

Second Embodiment

Figure 2:
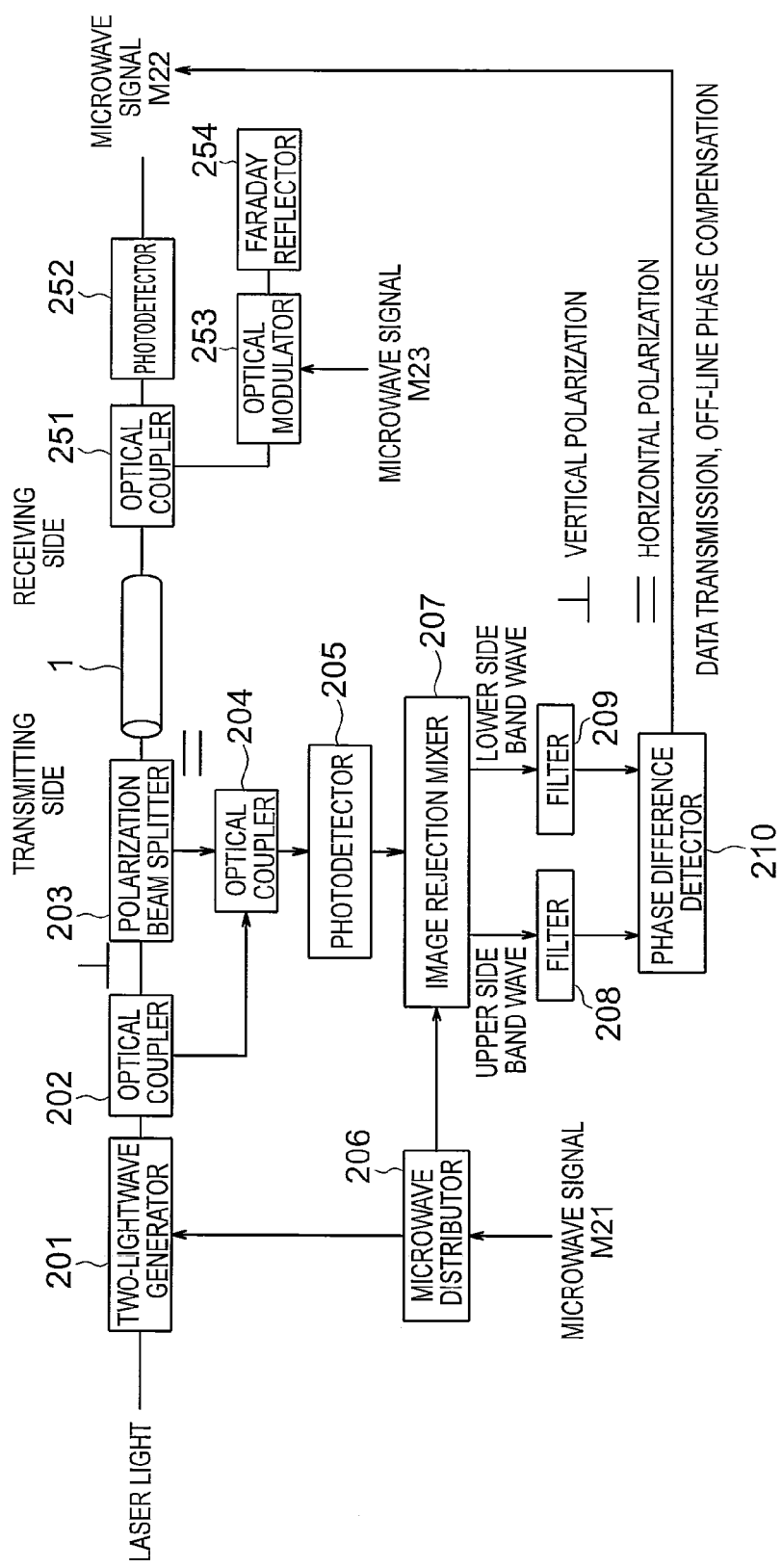
FIG. 2 is a diagram illustrating a configuration of an optical transmission system according to a second embodiment of the present invention.

FIG. 2 is referenced to describe an optical transmission system according to a second embodiment of the present invention. FIG. 2 is a diagram illustrating a configuration of the optical transmission system according to the second embodiment of the present invention.

In FIG. 2, the optical transmission system according to the second embodiment of the present invention is provided on the transmitting side with: a two-lightwave generator 201 for generating two optical signals (having wavelengths λ3 and λ4) that differ from each other by a frequency of a microwave signal M21 described later; an optical coupler 202 for distributing the optical signals; a polarization beam splitter 203; an optical coupler 204 for mixing the optical signals; a photodetector 205 for converting the optical signals into microwave signals; a microwave distributor 206 for distributing the microwave signal M21; an image rejection mixer 207 for frequency-converting the microwave signals from the photodetector 205 by using the microwave signal M21; a filter 208; a filter 209; and a phase difference detector 210 for detecting the phase difference between outputs from the filters 208 and 209.

Further, the optical transmission system is provided on the receiving side with: an optical coupler 251 for distributing the optical signals; a photodetector 252 for converting the optical signals into a microwave signal M22; an optical modulator 253 for frequency-shifting the optical signals by a frequency of a microwave signal M23; and a Faraday reflector 254 for reflecting the optical signals by applying Faraday rotation of 90 degrees thereto.

Next, FIG. 2 is referenced to describe an operation of the optical transmission system according to the second embodiment.

The optical transmission system according to the second embodiment is configured to transmit a low-frequency signal having a frequency lower than 20 GHz by microwave signal separation.

On the transmitting side, the microwave signal M21 that has been input passes through the microwave distributor 206, and is then sent to the two-lightwave generator 201. The microwave signal M21 is a low-frequency signal having a high stability to be transmitted.

From the input laser light, two coherent optical signals (having wavelengths λ3 and λ4) that differ from each other by the frequency of the microwave signal M21 is created by the two-lightwave generator 201. The two-lightwave generator 201 is configured to satisfy the condition that the two optical signals have their polarizations aligned, and may be a modulator such as an LN modulator or a system for creating two optical signals by using a sub-laser phase-locked with the laser light.

The two optical signals have a vertical polarization, and pass through the optical coupler 202 and the polarization beam splitter 203. Then, after passing through the optical fiber 1, the optical signals are distributed by the optical coupler 251 on the receiving side, and one pair of the two optical signals is guided to the photodetector 252 and output as the microwave signal M22. The user uses this signal (microwave signal M22) to perform a necessary signal processing including the integration processing. It is important that an integration processing time be three seconds or shorter.

The other pair of the two optical signals distributed by the optical coupler 251 is frequency-shifted by a frequency (shift frequency) of the microwave signal M23 as a round-trip signal by the optical modulator 253, and then reflected by the Faraday reflector 254. This Faraday reflector 254 applies Faraday rotation of 90 degrees to the optical signal, and hence the optical signal is reflected as an optical signal having a polarization that differs by 90 degrees. The reflected light is again frequency-shifted by the shift frequency by the optical modulator 253, then passes through the optical coupler 251 and the optical fiber 1, and is returned to the polarization beam splitter 203 on the transmitting side.

In consideration of reversibility of light, the returned optical signal becomes the optical signal having the polarization that differs by 90 degrees, therefore has a horizontal polarization, and is guided to the optical coupler 204 by the polarization beam splitter 203. The optical coupler 204 mixes the two optical signals distributed by the optical coupler 202 with the two optical signals from the polarization beam splitter 203. The optical signal from the polarization beam splitter 203 is different from the optical signal from the optical coupler 202 by a frequency twice as high as the shift frequency.

The optical signals that have passed through the optical coupler 204 are detected as microwave signals by the photodetector 205. The detected microwave signals exhibit a mixture of a signal phase having the same frequency as the frequency of the microwave signal M21, a signal phase higher than the microwave signal M21 by the frequency twice as high as the shift frequency, and a signal phase lower than the microwave signal M21 by the frequency twice as high as the shift frequency.

Those signals detected by the photodetector 205 are frequency-converted by the microwave signal M21 distributed from the microwave distributor 206 by the image rejection mixer 207. The image rejection mixer 207 outputs an upper side band wave and a lower side band wave. The upper side band wave exhibits (signal phase higher than the microwave signal M21 by the frequency twice as high as the shift frequency)-(phase of the microwave signal M21), and the lower side band wave exhibits (phase of the microwave signal M21)-(signal phase lower than the microwave signal M21 by the frequency twice as high as the shift frequency).

Those signals are input to the filters 208 and 209. Among the microwave signals detected by the photodetector 205, ones that have the same frequency as that of the microwave signal M21 that has been input are removed by the filters 208 and 209 as DC components.

The signals that have passed through the filters 208 and 209 have a phase difference therebetween detected by the phase difference detector 210.

The phase needs to be measured in synchronization with a signal integration processing timing at a transmission destination (on the receiving side), but the synchronization within one integration time suffices. It is important that the integration processing time be three seconds or shorter, which does not disturb a short-term phase stability. An amount of the phase difference detected by the phase difference detector 210 corresponds to one round trip through the optical fiber 1. In other words, the obtained phase difference contains an influence corresponding to the round-trip of the delay caused by having passed through the optical fiber 1 and the like. Therefore, a half of the amount of the phase difference obtained by the phase difference detector 210 is obtained as an additional phase caused by the delay of the optical fiber 1 and the like. The measured amount of the phase difference, which is a transmission path phase correction amount, is transmitted to the transmission destination to perform correction off-line on the integrated signal processing data acquired by the user.

The shift frequency is a low-frequency signal used for distinguishing the transmission optical signal from the return optical signal. The influence of the shift frequency and disturbance exerted during the transmission through the optical fiber 1, which enter the two optical signals in the same manner, can be handled as common-mode noise and disappear when the phase angle is calculated as a phase difference between the upper side band wave and the lower side band wave of the outputs from the image rejection mixer 207. In other words, there is no influence exerted on the amount of the phase difference obtained by the phase difference detector 210.

Third Embodiment

Figure 3:
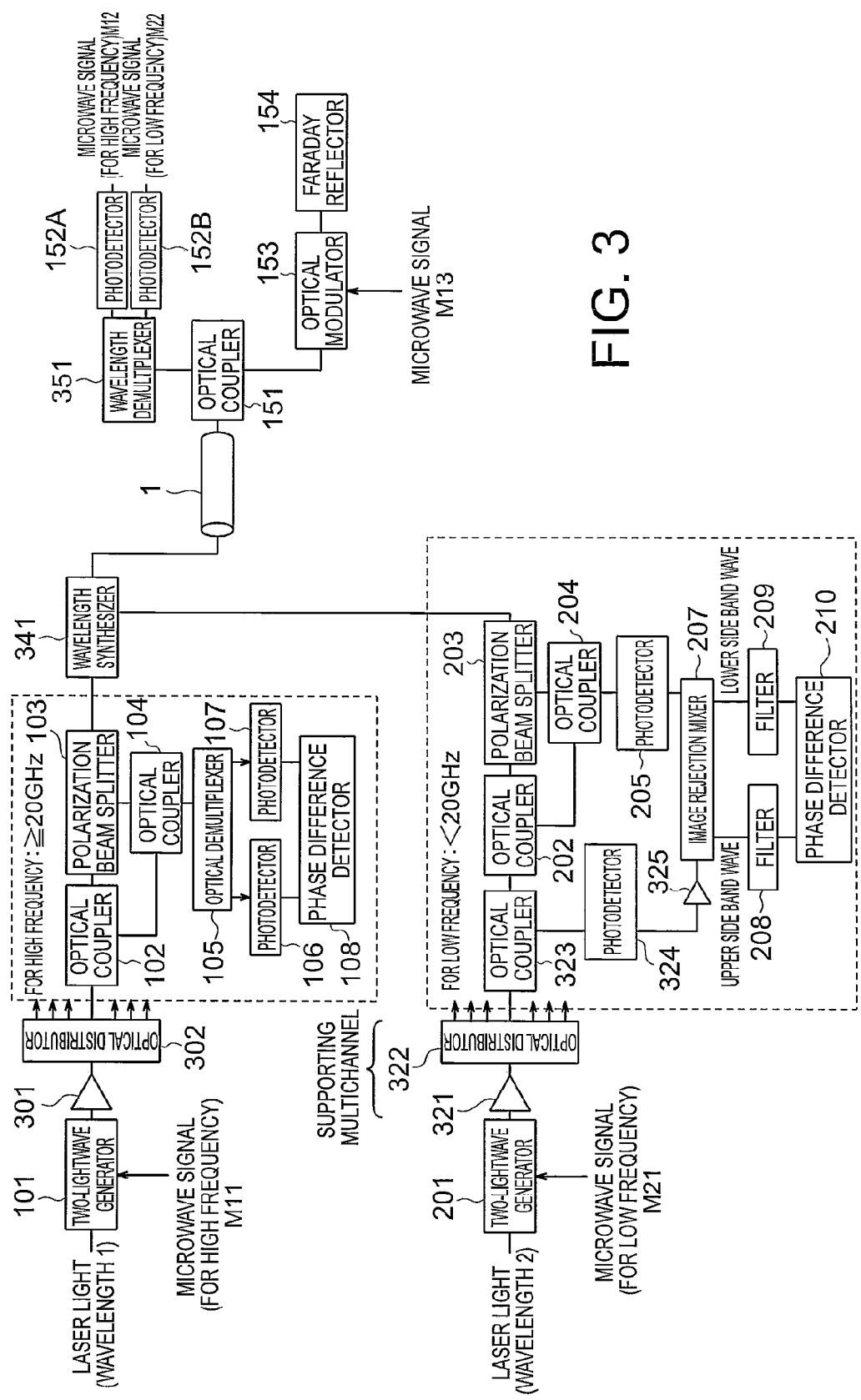
FIG. 3 is a diagram illustrating a configuration of an optical transmission system according to a third embodiment of the present invention.

FIG. 3 is referenced to describe an optical transmission system according to a third embodiment of the present invention. FIG. 3 is a diagram illustrating a configuration of the optical transmission system according to the third embodiment of the present invention.

The optical transmission system according to the third embodiment of the present invention is a combination of the above-mentioned optical transmission systems according to the first and second embodiments, and FIG. 3 illustrates a configuration that supports a multichannel and a simultaneous operation of the high-frequency signal and the low-frequency signal.

In FIG. 3, the laser light (having a wavelength 1 (λ1 and λ2)) indicated on the upper stage and the laser light (having a wavelength 2 (λ3 and λ4)) indicated on the lower stage are different from each other in optical wavelength. In the configuration that supports the simultaneous operation for a high-frequency signal and for a low-frequency signal, the optical coupler 151 (251), the optical modulator 153 (253), the Faraday reflector 154 (254), and the shift frequency on the receiving side can be shared.

The transmission signals are separated into the wavelength 1 (λ1 and λ2) and the wavelength 2 (λ3 and λ4) by a wavelength demultiplexer (wavelength division multiplexer) 351 on the receiving side, and the microwave signal M12 (for high frequency) and the microwave signal M22 (for low frequency) are output from a photodetector 152A and a photodetector 152B, respectively.

The microwave distributor 206 of FIG. 2 for a low-frequency signal can be made unnecessary by, as illustrated in FIG. 3, being replaced by microwave signal supply means including an optical coupler 323, a photodetector 324, and a microwave amplifier 325 to thereby extract the two optical signals (having wavelengths λ3 and λ4) by the optical coupler 323, detect the microwave signal M21 from the two optical signals by the photodetector 324, amplify the microwave signal M21 by the microwave amplifier 325, and supply the microwave signal M21 to the image rejection mixer 207.

In addition, in FIG. 3, provided on the transmitting side are an optical amplifier 301 and an optical distributor 302 for a high-frequency signal and an optical amplifier 321 and an optical distributor 322 for a low-frequency signal that support the multichannel. Further provided is a wavelength synthesizer (wavelength division multiplexer) 341 for synthesizing outputs from the polarization beam splitter 103 for a high-frequency signal and the polarization beam splitter 203 for a low-frequency signal. The wavelength synthesizer 341 also has a function of splitting the optical signal input from the opposite side respectively into the polarization beam splitters 103 and 203.

Figure 4:
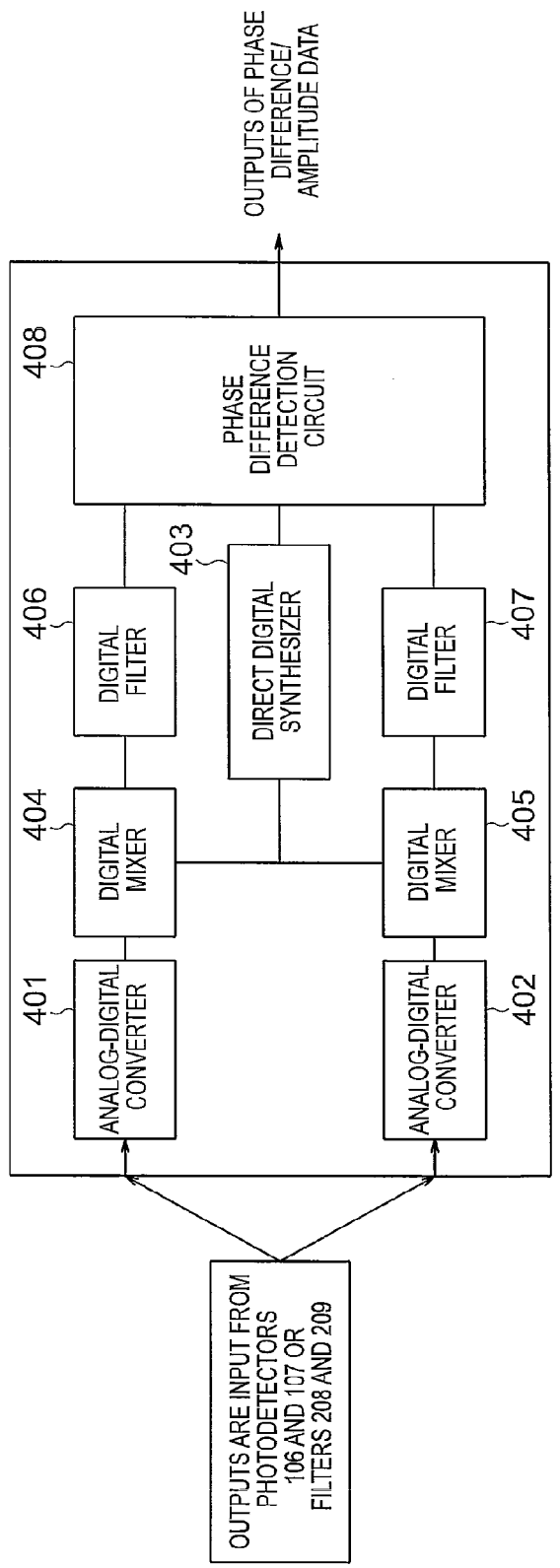
FIG. 4 is a block diagram illustrating a configuration of a phase difference detector of the optical transmission systems according to the first to third embodiments of the present invention.

Here, FIG. 4 is referenced to describe a phase difference detector common to the above-mentioned respective embodiments. FIG. 4 is a block diagram illustrating a configuration of the phase difference detector of the optical transmission systems according to the first to third embodiments of the present invention.

FIG. 4 illustrates an example of the phase difference detector that supports digitization. The signals input to the phase difference detectors 108 and 210 both for a low frequency and for a high frequency can be shared because of being having the frequency twice as high as the shift frequency.

The two input signals are A/D-converted respectively by analog-digital converters 401 and 402, and are digitally processed thereafter by all of the other components. First, a reference signal (frequency FHz: approximately several kHz) having a frequency obtained by shifting the frequency twice as high as the shift frequency by a small amount and a reference clock signal of FHz are created by a Direct Digital synthesizer (DDS) 403, and are multiplied by the signals A/D-converted by digital mixers 404 and 405 to thereby perform digital frequency-conversion. Unnecessary waves are removed by digital filters 406 and 407. A phase difference detection circuit 408 performs a correlation integration processing on output signals from the digital filters 406 and 407 by the reference clock signal and an orthogonal wave detection method, and calculates the phases and amplitudes thereof respectively. Further, the phase difference therebetween is calculated and output by the phase difference detection circuit 408. For orthogonal wave detection, for example, a Hilbert transform can be used, but the description is given by taking a digital averaging phase detector, which is more suitable for a digital circuit, as an example. A sine wave signal of FHz and a cosine wave signal of FHz corresponding to the reference clock signal are created by the Direct Digital synthesizer 403. The phase difference detection circuit 408 multiplies the sine wave signal and the cosine wave signal of FHz respectively by the output from the digital filter 406 and multiplies the sine wave signal and the cosine wave signal of FHz respectively by the output from the digital filter 407 to thereby obtain four correlations. The phase difference detection circuit 408 averages the four correlation outputs respectively (four averaged signals are S1, S2, S3, and S4 in the stated order) and obtains amplitudes (root sum square: amplitude $A1=SQRT(S1^2+S2^2)$ and amplitude $A2=SQRT(S3^2+S4^2)$) and phases (arc tangent: phase $\phi1=A\,TAN(S1/S2)$ and phase $\phi2=A\,TAN(S3/S4)$). By calculating a difference ($\phi1-\phi2$) between the two obtained phases ($\phi1$ and $\phi2$), it is possible to obtain the phase difference caused by the round trip through the optical fiber 1.

Figure 5:
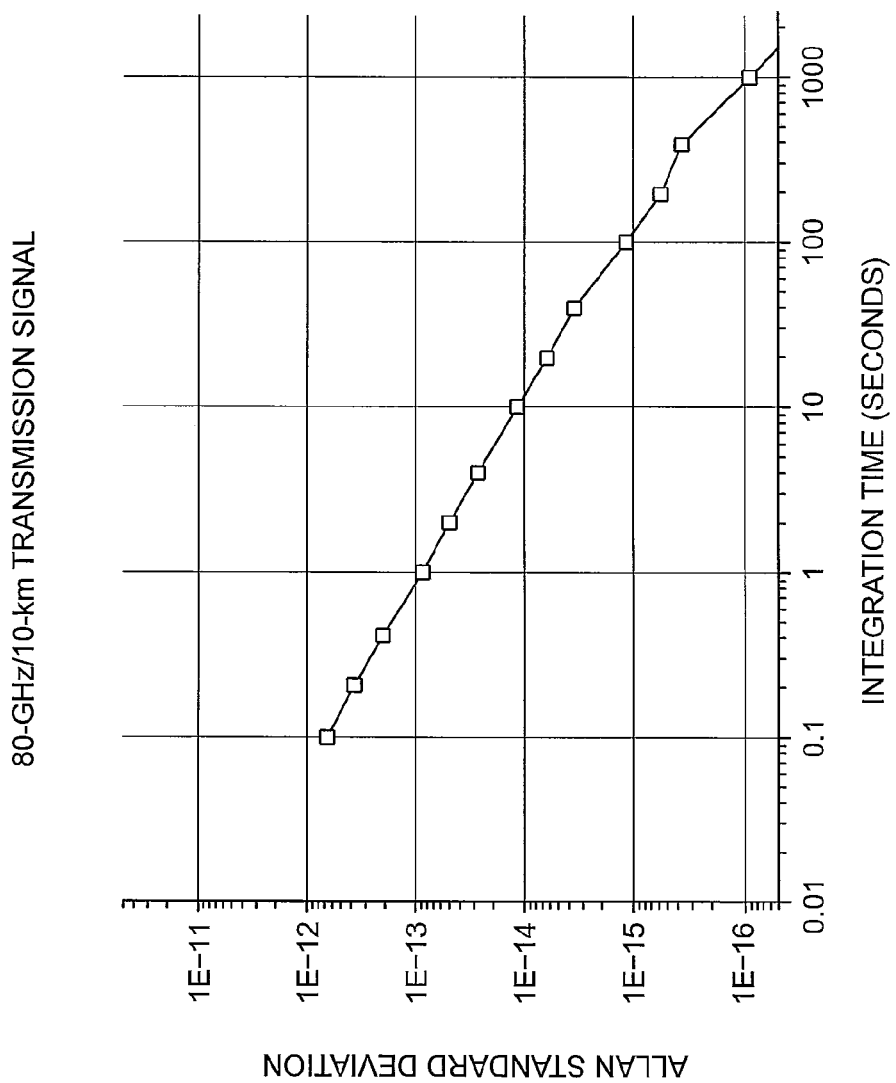
FIG. 5 is a graph illustrating characteristics of an Allan standard deviation with respect to an integration time in the optical transmission systems according to the first to third embodiments of the present invention.

FIG. 5 illustrates an improvement effect of the optical transmission systems according to the respective embodiments in the form of the graph of the phase stability. As the integration time, 0.1 seconds is used. Compared with FIG. 6, it is clear that there is no flicker frequency noise in the same manner as real-time transmission path compensation. Further, because the system configuration becomes simple as a whole, the signal loss is small, and the phase stability of the transmitted signal is further improved than in FIG. 6.

The optical transmission systems according to the respective embodiments can be applied to a signal transmission field in which a high stability in transmission of a reference signal of an interferometer or the like, transmission/distribution of a high-stability signal such as the national frequency standard, and the like is taken as an issue thereof, and to a field in which the transmission delay is taken as an issue thereof.

What is claimed is:

1. An optical transmission system for transmitting a high-frequency signal having a frequency equal to or higher than 20 GHz through an optical fiber over a long distance, comprising:

a two-lightwave generator for generating, from laser light that has been input, an optical signal having a first wavelength and an optical signal having a second wavelength, which differ from each other by a frequency of a first microwave signal being the high-frequency signal, by using the first microwave signal;

a first optical coupler for distributing two optical signals generated by the two-lightwave generator;

a polarization beam splitter for guiding one pair of the two optical signals distributed by the first optical coupler to the optical fiber;

a second optical coupler for distributing the two optical signals transmitted through the optical fiber;

a first photodetector for detecting a second microwave signal from one pair of the two optical signals distributed by the second optical coupler;

an optical modulator for frequency-shifting another pair of the two optical signals distributed by the second optical coupler by a frequency of a third microwave signal;

a Faraday reflector for reflecting the two optical signals frequency-shifted by the optical modulator by applying Faraday rotation of 90 degrees thereto;

a third optical coupler for mixing the two optical signals that have been reflected by the Faraday reflector, frequency-shifted again by the optical modulator, transmitted by the second optical coupler and the optical fiber, and guided by the polarization beam splitter, with another pair of the two optical signals distributed by the first optical coupler;

an optical demultiplexer for wavelength-dividing four optical signals mixed by the third optical coupler into the optical signal having the first wavelength and the optical signal having the second wavelength;

a second photodetector for detecting a beat signal of the optical signal having the first wavelength that has been wavelength-divided by the optical demultiplexer;

a third photodetector for detecting a beat signal of the optical signal having the second wavelength that has been wavelength-divided by the optical demultiplexer; and a phase difference detector for detecting a phase difference between the beat signal of the optical signal having the first wavelength and the beat signal of the optical signal having the second wavelength, which are detected by the second photodetector and the third photodetector, respectively, wherein the phase difference detector comprises:

a first analog-digital converter for analog/digital-converting the beat signal of the optical signal having the first wavelength detected by the second photodetector;

a second analog-digital converter for analog/digital-converting the beat signal of the optical signal having the second wavelength detected by the third photodetector;

a Direct Digital synthesizer for generating a reference signal having a frequency obtained by shifting a frequency twice as high as the frequency of the third microwave signal by a predetermined frequency and a reference clock signal having the same frequency as the frequency of the reference signal;

a first digital mixer for digitally frequency-converting an output signal from the first analog-digital converter by multiplying the output signal by the reference signal;

a second digital mixer for digitally frequency-converting an output signal from the second analog-digital converter by multiplying the output signal by the reference signal;

a first digital filter for removing an unnecessary wave from the output signal from the first digital mixer;

a second digital filter for removing an unnecessary wave from the output signal from the second digital mixer; and a phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and wherein the phase difference output from the phase difference detection circuit and the second microwave signal output from the first photodetector are output to the outside, so that a signal processing including an integration processing is performed by using the second microwave signal, and the processing time of the integration processing is three seconds or shorter, and an off-line correction is performed, by using the phase difference, on the signal obtained by the signal processing.

2. An optical transmission system for transmitting a low-frequency signal having a frequency lower than 20 GHz through an optical fiber over a long distance, comprising:

a microwave distributor for distributing a first microwave signal being the low-frequency signal;

a two-lightwave generator for generating, from laser light that has been input, an optical signal having a first wavelength and an optical signal having a second wavelength, which differ from each other by a frequency of the first microwave signal, by using one first microwave signal distributed by the microwave distributor;

a first optical coupler for distributing two optical signals generated by the two-lightwave generator;

a polarization beam splitter for guiding one pair of the two optical signals distributed by the first optical coupler to the optical fiber;

a second optical coupler for distributing the two optical signals transmitted through the optical fiber;

a first photodetector for detecting a second microwave signal from one pair of the two optical signals distributed by the second optical coupler;

an optical modulator for frequency-shifting another pair of the two optical signals distributed by the second optical coupler by a frequency of a third microwave signal;

a Faraday reflector for reflecting the two optical signals frequency-shifted by the optical modulator by applying Faraday rotation of 90 degrees thereto;

a third optical coupler for mixing the two optical signals that have been reflected by the Faraday reflector, frequency-shifted again by the optical modulator, transmitted by the second optical coupler and the optical fiber, and guided by the polarization beam splitter, with another pair of the two optical signals distributed by the first optical coupler;

a second photodetector for converting four optical signals mixed by the third optical coupler into microwave signals;

an image rejection mixer for outputting an upper side band wave and a lower side band wave after frequency-converting the microwave signals, which have been converted by the second photodetector, by using another first microwave signal distributed by the microwave distributor;

a first filter for removing a signal having the same frequency as the first microwave signal from the upper side band wave output by the image rejection mixer;

a second filter for removing a signal having the same frequency as the first microwave signal from the lower side band wave output by the image rejection mixer; and a phase difference detector for detecting a phase difference between a signal output by the first filter and a signal output by the second filter, wherein the phase difference detector comprises:

a first analog-digital converter for analog/digital-converting the signal output from the first filter;

a second analog-digital converter for analog/digital-converting the signal output from the second filter;

a Direct Digital synthesizer for generating a reference signal having a frequency obtained by shifting a frequency twice as high as the frequency of the third microwave signal by a predetermined frequency and a reference clock signal having the same frequency as the frequency of the reference signal;

a first digital mixer for digitally frequency-converting an output signal from the first analog-digital converter by multiplying the output signal by the reference signal;

a second digital mixer for digitally frequency-converting an output signal from the second analog-digital converter by multiplying the output signal by the reference signal;

a first digital filter for removing an unnecessary wave from the output signal from the first digital mixer;

a second digital filter for removing an unnecessary wave from the output signal from the second digital mixer; and a phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and wherein the phase difference output from the phase difference detection circuit and the second microwave signal output from the first photodetector are output to the outside,
so that a signal processing including an integration processing is performed by using the second microwave signal, and the processing time of the integration processing is three seconds or shorter, and
an off-line correction is performed, by using the phase difference, on the signal obtained by the signal processing.

3. An optical transmission system for transmitting a high-frequency signal having a frequency equal to or higher than 20 GHz and a low-frequency signal having a frequency lower than 20 GHz from a transmitting side to a receiving side through an optical fiber over a long distance, comprising:
a first two-lightwave generator for generating, from first laser light that has been input, an optical signal having a first wavelength and an optical signal having a second wavelength, which differ from each other by a frequency of a first microwave signal being the high-frequency signal, by using the first microwave signal;
a first optical coupler provided on the transmitting side, for distributing two optical signals generated by the first two-lightwave generator;
a first polarization beam splitter for guiding one pair of the two optical signals distributed by the first optical coupler;
a second two-lightwave generator for generating, from second laser light that has been input, an optical signal having a third wavelength and an optical signal having a fourth wavelength, which differ from each other by a frequency of a second microwave signal being the low-frequency signal, by using the second microwave signal;
microwave signal supply means for distributing two optical signals generated by the second two-lightwave generator, and supplying the second microwave signal detected from one pair of the two optical signals distributed by the microwave signal supply means;
a second optical coupler provided on the transmitting side, for again distributing another pair of the two optical signals distributed by the microwave signal supply means;
a second polarization beam splitter for guiding one pair of the two optical signals distributed by the second optical coupler;
a wavelength synthesizer for synthesizing the two optical signals guided by the first polarization beam splitter and the two optical signals guided by the second polarization beam splitter and guiding four optical signals to the optical fiber;
a third optical coupler provided on the receiving side, for distributing the four optical signals transmitted through the optical fiber;
a wavelength demultiplexer for separating one set of the four optical signals distributed by the third optical coupler into the two optical signals having the first wavelength and the second wavelength and the two optical signals having the third wavelength and the fourth wavelength;
a first photodetector provided on the receiving side, for detecting a third microwave signal from the two optical signals having the first wavelength and the second wavelength obtained by the separating performed by the wavelength demultiplexer;
a second photodetector provided on the receiving side, for detecting a fourth microwave signal from the two optical signals having the third wavelength and the fourth wavelength obtained by the separating performed by the wavelength demultiplexer;
an optical modulator for frequency-shifting another set of the four optical signals distributed by the third optical coupler by a frequency of a fifth microwave signal;
a Faraday reflector for reflecting the four optical signals frequency-shifted by the optical modulator by applying Faraday rotation of 90 degrees thereto;
a fourth optical coupler provided on the transmitting side, for mixing the two optical signals that have been reflected by the Faraday reflector, frequency-shifted again by the optical modulator, transmitted by the third optical coupler and the optical fiber, and guided by the wavelength synthesizer and the first polarization beam splitter, with another pair of the two optical signals distributed by the first optical coupler;
an optical demultiplexer for wavelength-dividing four optical signals mixed by the fourth optical coupler into the optical signal having the first wavelength and the optical signal having the second wavelength;
a third photodetector provided on the transmitting side, for detecting a beat signal of the optical signal having the first wavelength that has been wavelength-divided by the optical demultiplexer;
a fourth photodetector provided on the transmitting side, for detecting a beat signal of the optical signal having the second wavelength that has been wavelength-divided by the optical demultiplexer;
a first phase difference detector for detecting a phase difference between the beat signal of the optical signal having the first wavelength and the beat signal of the optical signal having the second wavelength, which are detected by the third photodetector and the fourth photodetector, respectively;
a fifth optical coupler provided on the transmitting side, for mixing the two optical signals that have been reflected by the Faraday reflector, frequency-shifted again by the optical modulator, transmitted by the third optical coupler and the optical fiber, and guided by the wavelength synthesizer and the second polarization beam splitter, with another pair of the two optical signals distributed by the second optical coupler;
a fifth photodetector provided on the transmitting side, for converting four optical signals mixed by the fifth optical coupler into microwave signals;
an image rejection mixer for outputting an upper side band wave and a lower side band wave after frequency-converting the microwave signals, which have been converted by the fifth photodetector, by using the first microwave signal supplied by the microwave signal supply means;
a first filter for removing a signal having the same frequency as the first microwave signal from the upper side band wave output by the image rejection mixer;
a second filter for removing a signal having the same frequency as the first microwave signal from the lower side band wave output by the image rejection mixer; and
a second phase difference detector for detecting a phase difference between a signal output by the first filter and a signal output by the second filter,
wherein the first phase difference detector comprises:
a first analog-digital converter for analog/digital-converting the beat signal of the optical signal having the first wavelength detected by the third photodetector;

a second analog-digital converter for analog/digital-converting the beat signal of the optical signal having the second wavelength detected by the fourth photodetector:

a first Direct Digital synthesizer for generating a reference signal having a frequency obtained by shifting a frequency twice as high as the frequency of the fifth microwave by a predetermined frequency and a reference clock signal having the same frequency as the frequency of the reference signal;

a first digital mixer for digitally frequency-converting an output signal from the first analog-digital converter by multiplying the output signal by the reference signal;

a second digital mixer for digitally frequency-converting an output signal from the second analog-digital converter by multiplying the output signal by the reference signal;

a first digital filter for removing an unnecessary wave from the output signal output from the first digital mixer;

a second digital filter for removing an unnecessary wave from the output signal output from the second digital mixer; and a first phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and wherein the second phase difference detector comprises:
a third analog-digital converter for analog/digital-converting the signal output from the first filter;

a fourth analog-digital converter for analog/digital-converting the signal output from the second filter:

a second Direct Digital synthesizer for generating a reference signal having a frequency obtained by shifting a frequency twice as high as the frequency of the fifth microwave signal by a predetermined frequency and a reference clock signal having the same frequency as the frequency of the reference signal;

a third digital mixer for digitally frequency-converting an output signal from the third analog-digital converter by multiplying the output signal by the reference signal;

a fourth digital mixer for digitally frequency-converting an output signal from the fourth analog-digital converter by multiplying the output signal by the reference signal;

a third digital filter for removing an unnecessary wave from the output signal output from the third digital mixer;

a fourth digital filter for removing an unnecessary wave from the output signal output from the fourth digital mixer; and a second phase difference detection circuit for performing a correlation integration processing on a third output signal and a fourth output signal from the third digital filter and the fourth digital filter, respectively, by using the reference clock signal and an orthogonal wave detection method, calculating respective phases of the third output signal and the fourth output signal, and calculating and outputting a phase difference between the third output signal and the fourth output signal, and wherein the phase differences output from the first and second phase difference detection circuits and the third and fourth microwave signals output from the first and second photodetectors are output to the outside, so that a signal processing including an integration processing is performed by using the third microwave signal, and the processing time of the integration processing is three seconds or shorter, a signal processing including an integration processing is performed by using the fourth microwave signal, and the processing time of the integration processing is three seconds or shorter, and an off-line correction is performed, by using the phase differences respectively, on each of the signals obtained by the signal processings.

4. An optical transmission method of transmitting a high-frequency signal having a frequency equal to or higher than 20 GHz through an optical fiber over a long distance, comprising:

generating, by a two-lightwave generator, from laser light that has been input, an optical signal having a first wavelength and an optical signal having a second wavelength, which differ from each other by a frequency of a first microwave signal being the high-frequency signal, by using the first microwave signal;

distributing, by a first optical coupler, two optical signals generated by the two-lightwave generator;

guiding, by a polarization beam splitter, one pair of the two optical signals distributed by the first optical coupler to the optical fiber;

distributing, by a second optical coupler, the two optical signals transmitted through the optical fiber;

detecting, by a first photodetector, a second microwave signal from one pair of the two optical signals distributed by the second optical coupler;

frequency-shifting, by an optical modulator, another pair of the two optical signals distributed by the second optical coupler by a frequency of a third microwave signal;

reflecting, by a Faraday reflector, the two optical signals frequency-shifted by the optical modulator by applying Faraday rotation of 90 degrees thereto;

mixing, by a third optical coupler, the two optical signals that have been reflected by the Faraday reflector, frequency-shifted again by the optical modulator, transmitted by the second optical coupler and the optical fiber, and guided by the polarization beam splitter, with another pair of the two optical signals distributed by the first optical coupler;

wavelength-dividing, by an optical demultiplexer, four optical signals mixed by the third optical coupler into the optical signal having the first wavelength and the optical signal having the second wavelength;

detecting, by a second photodetector, a beat signal of the optical signal having the first wavelength that has been wavelength-divided by the optical demultiplexer;

detecting, by a third photodetector, a beat signal of the optical signal having the second wavelength that has been wavelength-divided by the optical demultiplexer; and detecting, by a phase difference detector, a phase difference between the beat signal of the optical signal having the first wavelength and the beat signal of the optical signal having the second wavelength, which are detected by the second photodetector and the third photodetector, respectively, wherein the phase difference detector comprises:
a first analog-digital converter for analog/digital-converting the beat signal of the optical signal having the first wavelength detected by the second photodetector;

a second analog-digital converter for analog/digital-converting the beat signal of the optical signal having the second wavelength detected by the third photodetector;
a Direct Digital synthesizer for generating a reference signal having a frequency obtained by shifting a frequency twice as high as the frequency of the third microwave signal by a predetermined frequency and a reference clock signal having the same frequency as the frequency of the reference signal;
a first digital mixer for digitally frequency-converting an output signal from the first analog-digital converter by multiplying the output signal by the reference signal;
a second digital mixer for digitally frequency-converting an output signal from the second analog-digital converter by multiplying the output signal by the reference signal;
a first digital filter for removing an unnecessary wave from the output signal from the first digital mixer;
a second digital filter for removing an unnecessary wave from the output signal from the second digital mixer; and
a phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and
wherein the phase difference output from the phase difference detection circuit and the second microwave signal output from the first photodetector are output to the outside,
so that a signal processing including an integration processing is performed by using the second microwave signal, and the processing time of the integration processing is three seconds or shorter, and
an off-line correction is performed, by using the phase difference, on the signal obtained by the signal processing.

5. An optical transmission method of transmitting a low-frequency signal having a frequency lower than 20 GHz through an optical fiber over a long distance, comprising:
distributing, by a microwave distributor, a first microwave signal being the low-frequency signal;
generating, by a two-lightwave generator, from laser light that has been input, an optical signal having a first wavelength and an optical signal having a second wavelength, which differ from each other by a frequency of the first microwave signal, by using one first microwave signal distributed by the microwave distributor;
distributing, by a first optical coupler, two optical signals generated by the two-lightwave generator;
guiding, by a polarization beam splitter, one pair of the two optical signals distributed by the first optical coupler to the optical fiber;
distributing, by a second optical coupler, the two optical signals transmitted through the optical fiber;
detecting, by a first photodetector, a second microwave signal from one pair of the two optical signals distributed by the second optical coupler;
frequency-shifting, an optical modulator, another pair of the two optical signals distributed by the second optical coupler by a frequency of a third microwave signal;
reflecting, by a Faraday reflector, the two optical signals frequency-shifted by the optical modulator by applying Faraday rotation of 90 degrees thereto;
mixing, by a third optical coupler, the two optical signals that have been reflected by the Faraday reflector, frequency-shifted again by the optical modulator, transmitted by the second optical coupler and the optical fiber, and guided by the polarization beam splitter, with another pair of the two optical signals distributed by the first optical coupler;
converting, by a second photodetector, four optical signals mixed by the third optical coupler into microwave signals;
outputting, by an image rejection mixer, an upper side band wave and a lower side band wave after frequency-converting the microwave signals, which have been converted by the second photodetector, by using another first microwave signal distributed by the microwave distributor;
removing, by a first filter, a signal having the same frequency as the first microwave signal from the upper side band wave output by the image rejection mixer;
removing, by a second filter, a signal having the same frequency as the first microwave signal from the lower side band wave output by the image rejection mixer; and
detecting, by a phase difference detector, a phase difference between a signal output by the first filter and a signal output by the second filter,
wherein the phase difference detector comprises:
a first analog-digital converter for analog/digital-converting the signal output from the first filter;
a second analog-digital converter for analog/digital-converting the signal output from the second filter;
a Direct Digital synthesizer for generating a reference signal having a frequency obtained by shifting a frequency twice as high as the frequency of the third microwave signal by a predetermined frequency and a reference clock signal having the same frequency as the frequency of the reference signal;
a first digital mixer for digitally frequency-converting an output signal from the first analog-digital converter by multiplying the output signal by the reference signal;
a second digital mixer for digitally frequency-converting an output signal from the second analog-digital converter by multiplying the output signal by the reference signal;
a first digital filter for removing an unnecessary wave from the output signal from the first digital mixer;
a second digital filter for removing an unnecessary wave from the output signal from the second digital mixer; and
a phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and
wherein the phase difference output from the phase difference detection circuit and the second microwave signal output from the first photodetector are output to the outside,
so that a signal processing including an integration processing is performed by using the second microwave signal, and the processing time of the integration processing is three seconds or shorter, and
an off-line correction is performed, by using the phase difference, on the signal obtained by the signal processing.

6. An optical transmission method of transmitting a high-frequency signal having a frequency equal to or higher than 20 GHz and a low-frequency signal having a frequency lower than 20 GHz from a transmitting side to a receiving side through an optical fiber over a long distance, comprising:

generating, by a first two-lightwave generator, from first laser light that has been input, an optical signal having a first wavelength and an optical signal having a second wavelength, which differ from each other by a frequency of a first microwave signal being the high-frequency signal, by using the first microwave signal;

distributing, by a first optical coupler provided on the transmitting side, two optical signals generated by the first two-lightwave generator;

guiding, by a first polarization beam splitter, one pair of the two optical signals distributed by the first optical coupler;

generating, by a second two-lightwave generator, from second laser light that has been input, an optical signal having a third wavelength and an optical signal having a fourth wavelength, which differ from each other by a frequency of a second microwave signal being the low-frequency signal, by using the second microwave signal;

distributing, by microwave signal supply means, two optical signals generated by the second two-lightwave generator, and supplying the second microwave signal detected from one pair of the two optical signals distributed by the microwave signal supply means;

again distributing, by a second optical coupler provided on the transmitting side, another pair of the two optical signals distributed by the microwave signal supply means;

guiding, by a second polarization beam splitter, one pair of the two optical signals distributed by the second optical coupler;

synthesizing, by a wavelength synthesizer, the two optical signals guided by the first polarization beam splitter and the two optical signals guided by the second polarization beam splitter, and guiding four optical signals to the optical fiber;

distributing, a third optical coupler provided on the receiving side, the four optical signals transmitted through the optical fiber;

separating, by a wavelength demultiplexer, one set of the four optical signals distributed by the third optical coupler into the two optical signals having the first wavelength and the second wavelength and the two optical signals having the third wavelength and the fourth wavelength;

detecting, by a first photodetector provided on the receiving side, a third microwave signal from the two optical signals having the first wavelength and the second wavelength obtained by the separating performed by the wavelength demultiplexer;

detecting, by a second photodetector provided on the receiving side, a fourth microwave signal from the two optical signals having the third wavelength and the fourth wavelength obtained by the separating performed by the wavelength demultiplexer;

frequency-shifting, by an optical modulator, another set of the four optical signals distributed by the third optical coupler by a frequency of a fifth microwave signal;

reflecting, by a Faraday reflector, the four optical signals frequency-shifted by the optical modulator by applying Faraday rotation of 90 degrees thereto;

mixing, by a fourth optical coupler provided on the transmitting side, the two optical signals that have been reflected by the Faraday reflector, frequency-shifted again by the optical modulator, transmitted by the third optical coupler and the optical fiber, and guided by the wavelength synthesizer and the first polarization beam splitter, with another pair of the two optical signals distributed by the first optical coupler;

wavelength-dividing, by an optical demultiplexer, four optical signals mixed by the fourth optical coupler into the optical signal having the first wavelength and the optical signal having the second wavelength;

detecting, by a third photodetector provided on the transmitting side, a beat signal of the optical signal having the first wavelength that has been wavelength-divided by the optical demultiplexer;

detecting, by a fourth photodetector provided on the transmitting side, a beat signal of the optical signal having the second wavelength that has been wavelength-divided by the optical demultiplexer;

detecting, by a first phase difference detector, a phase difference between the beat signal of the optical signal having the first wavelength and the beat signal of the optical signal having the second wavelength, which are detected by the third photodetector and the fourth photodetector, respectively;

mixing, by a fifth optical coupler provided on the transmitting side, the two optical signals that have been reflected by the Faraday reflector, frequency-shifted again by the optical modulator, transmitted by the third optical coupler and the optical fiber, and guided by the wavelength synthesizer and the second polarization beam splitter, with another pair of the two optical signals distributed by the second optical coupler;

converting, by a fifth photodetector provided on the transmitting side, the four optical signals mixed by the fifth optical coupler into microwave signals;

outputting, by an image rejection mixer, an upper side band wave and a lower side band wave after frequency-converting the microwave signals, which have been converted by the fifth photodetector, by using the first microwave signal supplied by the microwave signal supply means;

removing, by a first filter, a signal having the same frequency as the first microwave signal from the upper side band wave output by the image rejection mixer;

removing, by a second filter, a signal having the same frequency as the first microwave signal from the lower side band wave output by the image rejection mixer; and detecting, by a second phase difference detector, a phase difference between a signal output by the first filter and a signal output by the second filter, wherein the first phase difference detector comprises:

a first analog-digital converter for analog/digital-converting the beat signal of the optical signal having the first wavelength detected by the third photodetector;

a second analog-digital converter for analog/digital-converting the beat signal of the optical signal having the second wavelength detected by the fourth photodetector;

a first Direct Digital synthesizer for generating a reference signal having a frequency obtained by shifting a frequency twice as high as the frequency of the fifth microwave signal by a predetermined frequency and a reference clock signal having the same frequency as the frequency of the reference signal;

a first digital mixer for digitally frequency-converting an output signal from the first analog-digital converter by multiplying the output signal by the reference signal;

a second digital mixer for digitally frequency-converting an output signal from the second analog-digital converter by multiplying the output signal by the reference signal;

a first digital filter for removing an unnecessary wave from the output signal from the first digital mixer;

a second digital filter for removing an unnecessary wave from the output signal from the second digital mixer; and a first phase difference detection circuit for performing a correlation integration processing on a first output signal and a second output signal from the first digital filter and the second digital filter, respectively, by using the reference clock signal and an orthogonal wave detection method, calculating respective phases of the first output signal and the second output signal, and calculating and outputting a phase difference between the first output signal and the second output signal, and wherein the second phase difference detector comprises:

a third analog-digital converter for analog/digital-converting the signal output from the first filter;

a fourth analog-digital converter for analog/digital-converting the signal output from the second filter;

a second Direct Digital synthesizer for generating a reference signal having a frequency obtained by shifting a frequency twice as high as the frequency of the fifth microwave signal by a predetermined frequency and a reference clock signal having the same frequency as the frequency of the reference signal;

a third digital mixer for digitally frequency-converting an output signal from the third analog-digital converter by multiplying the output signal by the reference signal;

a fourth digital mixer for digitally frequency-converting an output signal from the fourth analog-digital converter by multiplying the output signal by the reference signal;

a third digital filter for removing an unnecessary wave from the output signal from the third digital mixer;

a fourth digital filter for removing an unnecessary wave from the output signal from the fourth digital mixer; and a second phase difference detection circuit for performing a correlation integration processing on a third output signal and a fourth output signal from the third digital filter and the fourth digital filter, respectively, by using the reference clock signal and an orthogonal wave detection method, calculating respective phases of the third output signal and the fourth output signal, and calculating and outputting a phase difference between the third output signal and the fourth output signal, and wherein the phase differences output from the first and second phase difference detection circuits and the third and fourth microwave signals output from the first and second photodetectors are output to the outside, so that a signal processing including an integration processing is performed by using the third microwave signal, and the processing time of the integration processing is three seconds or shorter, a signal processing including an integration processing is performed by using the fourth microwave signal, and the processing time of the integration processing is three seconds or shorter, and an off-line correction is performed, by using the phase differences respectively, on each of the signals obtained by the signal processings.

\* \* \* \* \*